United States Patent

Sudau et al.

[11] Patent Number: 5,836,217
[45] Date of Patent: Nov. 17, 1998

[54] TORSIONAL VIBRATION DAMPER

[75] Inventors: Jörg Sudau, Niederwerrn; Bernhard Schierling, Kürnach, both of Germany

[73] Assignee: Fichtel & Sachs AG, Schweinfurt, Germany

[21] Appl. No.: 890,170

[22] Filed: Jul. 9, 1997

[30] Foreign Application Priority Data

Jul. 10, 1996 [DE] Germany .................... 196 27 764.7

[51] Int. Cl.⁶ .......................... F16F 15/10; F16F 15/22; G05G 1/00
[52] U.S. Cl. ...................... 74/574; 74/572; 74/573 R; 74/273 F
[58] Field of Search ............... 74/572–574; 192/30 V; 464/68, 69

[56] References Cited

U.S. PATENT DOCUMENTS

| | | | |
|---|---|---|---|
| 1,716,225 | 6/1929 | Georgevitch | 74/572 |
| 2,653,457 | 9/1953 | Guernsey et al. | 74/572 |
| 4,346,624 | 8/1982 | Nagasaki et al. | 74/572 |
| 4,411,171 | 10/1983 | Fiala | 74/572 X |
| 4,573,374 | 3/1986 | Koshimo et al. | 74/574 |
| 4,676,121 | 6/1987 | Kouno | 74/574 |

FOREIGN PATENT DOCUMENTS

| | | | |
|---|---|---|---|
| 831992 | 9/1938 | France | 74/572 |
| 911612 | 7/1946 | France | 74/572 |
| 37 44 881 | 6/1987 | Germany | F16D 13/60 |
| 2 229 793 | 10/1990 | United Kingdom | F16D 3/14 |
| 2 254 906 | 10/1992 | United Kingdom | F16D 3/10 |
| 2 280 943 | 2/1995 | United Kingdom | F16D 3/10 |
| 2 284 039 | 5/1995 | United Kingdom | F16D 3/10 |
| 2 310 911 | 9/1997 | United Kingdom | F16F 15/34 |

*Primary Examiner*—Vinh T. Luong
*Attorney, Agent, or Firm*—Cohen, Pontani, Lieberman & Pavane

[57] ABSTRACT

A torsional vibration damper has at least one inertia mass, which is connected in a rotation-proof manner to a drive and acts upon an absorption mass. The absorption mass is rotatable relative to the inertia mass and is connected thereto via connecting elements. Associated with the absorption mass is a balancing weight, which is connected via a movement-transmitting transmission to the absorption mass, on the one hand, and to the inertia mass, on the other hand.

8 Claims, 3 Drawing Sheets

TORSIONAL VIBRATION DAMPER

BACKGROUND OF THE INVENTION

1. Field of the Invention

The invention relates to a torsional vibration damper.

2. Description of the Prior Art

German reference DE 37 44 881 C2 discloses a torsional vibration damper that has an inertia mass which carries a friction clutch that is connected in a rotation-proof manner to a crankshaft that acts as the drive of an internal combustion engine. An absorption mass, which is arranged on a roller bearing on the side of the inertia mass that faces the drive, is rotatable relative to the inertia mass and is connected thereto by springs that run in the circumferential direction.

Absorption masses like those according to the aforementioned German reference have the disadvantage of functioning optimally only at a certain speed. It is also disadvantageous that the absorption mass, if it is to have a particular inertia, must have a heavy weight. In other words, if the absorption mass is designed to be relatively light weight in order to limit the weight of the torsional vibration damper, its inertia on the torsional vibrations of the drive and thus its counteraction relative to these torsional vibrations will be relatively low from the start.

SUMMARY OF THE INVENTION

Accordingly, it is an object of the present invention to provide a torsional vibration damper having an absorption mass in which the effect of the torsional vibration damper extends at least over a certain speed range and sufficient inertia can be provided by the absorption mass at the lowest possible weight.

Pursuant to this object, and others which will become apparent hereafter, one aspect of the present invention resides in a torsional vibration damper in which a balancing weight is associated with the absorption mass. The balancing weight is connected via a movement-transmitting transmission to the absorption mass, on the one hand, and to the inertia mass, on the other. Torsional vibrations passed to the absorption mass are transmitted by the transmission and passed on to the balancing weight. Given a proper choice of transmission ratio, balancing weight size and radial distance between the balancing weight and the center of rotation, the total absorption mass obtains an inertial moment considerably greater than that of a one-piece absorption mass of the same weight. As a result, the formation of torsional vibrations is already weakened before the inertia mass, so that the actual damping part of the torsional vibration damper is only required to damp torsional vibrations of lesser amplitude. When only one inertia mass is used in the actual damping part, the inertia mass can be the clutch disk in connection with the counterfriction surfaces on the pressure and counterpressure plates. When a dual-mass flywheel is used, the inertia mass can be the spring/damper unit between the two inertia masses. Both embodiments of a friction clutch can be connected to the absorption mass according to the invention.

The function of the absorption mass in a certain speed range results, for example, from the fact that the balancing weight is connected to the absorption mass on the one hand and to the inertia mass on the other, e.g., via a linking gear. Preferably, the links are arranged relative to each other so that they begin to move radially outward under the effect of centrifugal force starting at a base speed, which preferably lies below the idle speed, until they achieve a final position at a certain upper speed limit. Although the links cannot be expected to move in the event of further speed increases, the simulated rigidity does change, due to the active forces, in that the resistance offered by the links to a torsional vibration, which attempts to pull the links radially inward, increases along with speed.

The torsional vibration damper is embodied compactly in the axial direction by the axial arrangement of both the transmission and the balancing weight between the absorption mass and the inertia mass, since the two connection ends for transmission elements are axially directly adjacent one another.

Pursuant to the invention, the connecting element can be formed by a spring, for example, which has one end that rests on the inertia mass and another end that rests on a transmission element that is connected to the absorption mass. This prevents the transmission elements from spinning, because the connecting elements permit the two masses to vibrate relative to each other only by their respective zero positions. As a result, the relative movement between the individual transmission elements is very slight. Furthermore, it is possible to dispense with a support for at least one of the transmission elements on a transmission bell encompassing the torsional vibration damper or on the drive.

The transmission is advantageously embodied as a planetary gear or as a linkage gear. While the planetary gear permits outstanding transmission of inertia, the linkage gear, for the reasons stated above, offers the particular option of simulating a rigidity that can be varied via speed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
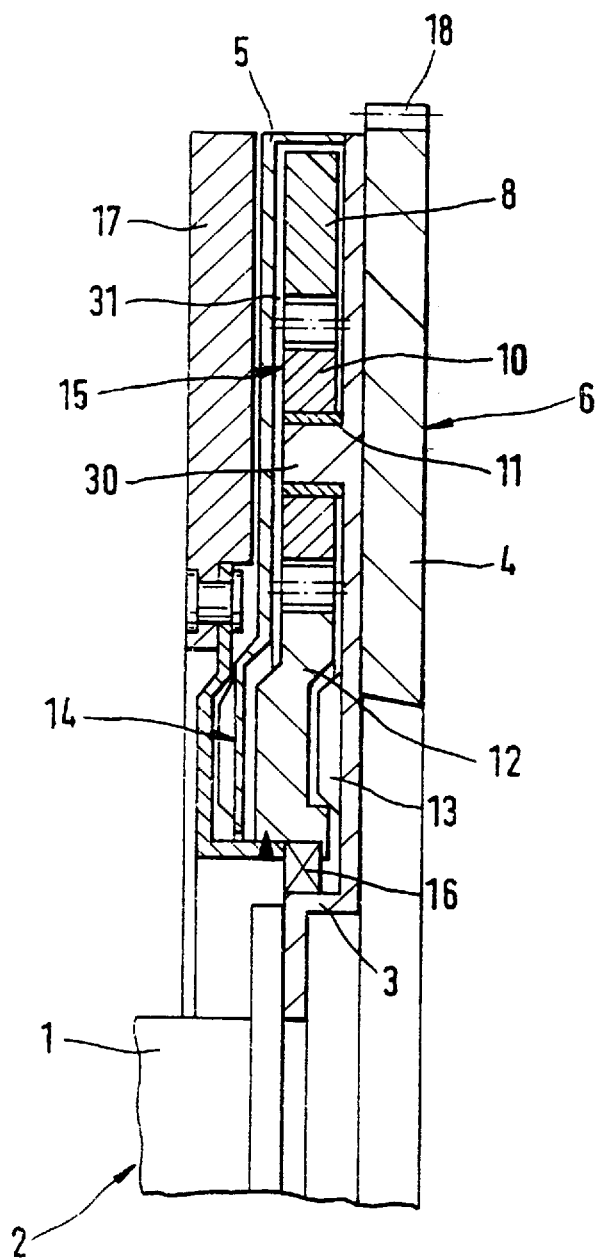
FIG. 1 is a sectional view of an inertia mass and an absorption mass associated with a balancing weight via a transmission in the form of a planetary gear.

FIG. 1 shows a torsional vibration damper, in which a flange 3, which runs radially outward, is attached to a crankshaft 1 of a drive 2. On its right side in FIG. 1, the flange 3 holds a mass 4, which has a toothing 18 in the circumferential region. A starter pinion (not shown) engages into the toothing 18. On its side facing away from the flange 3, the mass 4 serves to accommodate a conventional (and therefore not shown) friction clutch. The flange 3 and the mass 4 are parts on an inertia mass 6.

The flange 3 is connected in its radial outer region to a sealing plate 5, which reaches radially inward almost to a bearing 16, that is radially fixed to the flange 3. The sealing plate 5 and the flange 3 form a grease chamber 31. A planetary gear 10 is rotatably mounted in the chamber 31 on a projection 30 via a bearing sleeve 11. The flange 3 thus acts as a planetary carrier. The planetary gear 10 engages in its radial outer region with a hollow gear 8 that floats in the circumferential direction. The hollow gear 8 thereby acts as a balancing weight. In the radially inner region, the planetary gear 10 engages with a sun gear 12, which is arranged on the bearing 16 and is securely connected to an absorption mass 17. The sun gear 12 is connected by springs 13 running in the circumferential direction, to projections on the flange 3 and the sealing plate 5, so that the springs 13 act as connecting elements 14. A transmission 15 in the form of a planetary transmission is formed by the following elements the sun gear 12, the planetary gears 10 and the hollow gear 8, together with the planetary carrier.

The inventive torsional vibration damper functions as follows: Upon introduction of a torsional vibration through the crankshaft 1 of the drive 2, the inertia mass 6 causes, via the connecting elements 14, a relative deflection of the sun gear 12 and thus of the absorption mass 17. Due to this relative deflection, the sun gear 12, via the planetary gears 10, drives the hollow gear 8, which serves, due to the transmission produced by the transmission 15, as the balancing weight, which acts with higher dynamic inertia than the absorption mass 17. This is because the hollow gear 8, due to the transmission 15, is deflected at higher speed than the absorption mass 17, so that the acceleration needed for the movement at the hollow gear 8 is relatively great. As a result, the formation of the torsional vibrations can be opposed. A dynamic damping is created when the grease chamber 31 is at least partially filled with viscous grease, because grease located between the intermeshed teeth is compressed when the toothed gears roll off on each other.

Figure 2:
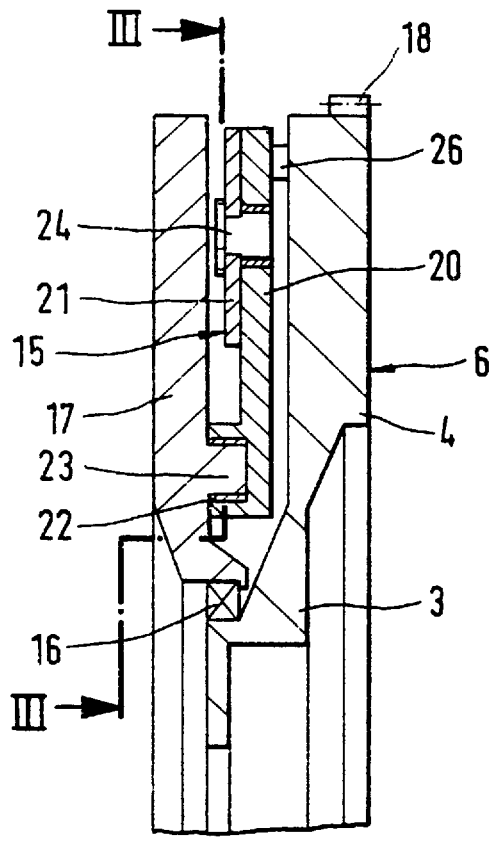
FIG. 2 is a view as in FIG. 1, but with a transmission with two links.

FIG. 2 shows a torsional vibration damper that basically differs from that in FIG. 1 with respect to the transmission 15. Instead of a planetary transmission, two links 20, 21 are provided (see FIG. 3 especially). The link 20 is connected via a bearing sleeve 22 to a projection 23 of the absorption mass 17. The link 21, is connected in an articulated fashion to the link 20 by a pin 24, and is further connected by an articulated connection 26 to the inertia mass 6. Of course, the flange 3 of the inertia mass 6 is also attached to a crankshaft in the case of this torsional vibration damper, but for the sake of simplicity this is not shown.

Figure 3:
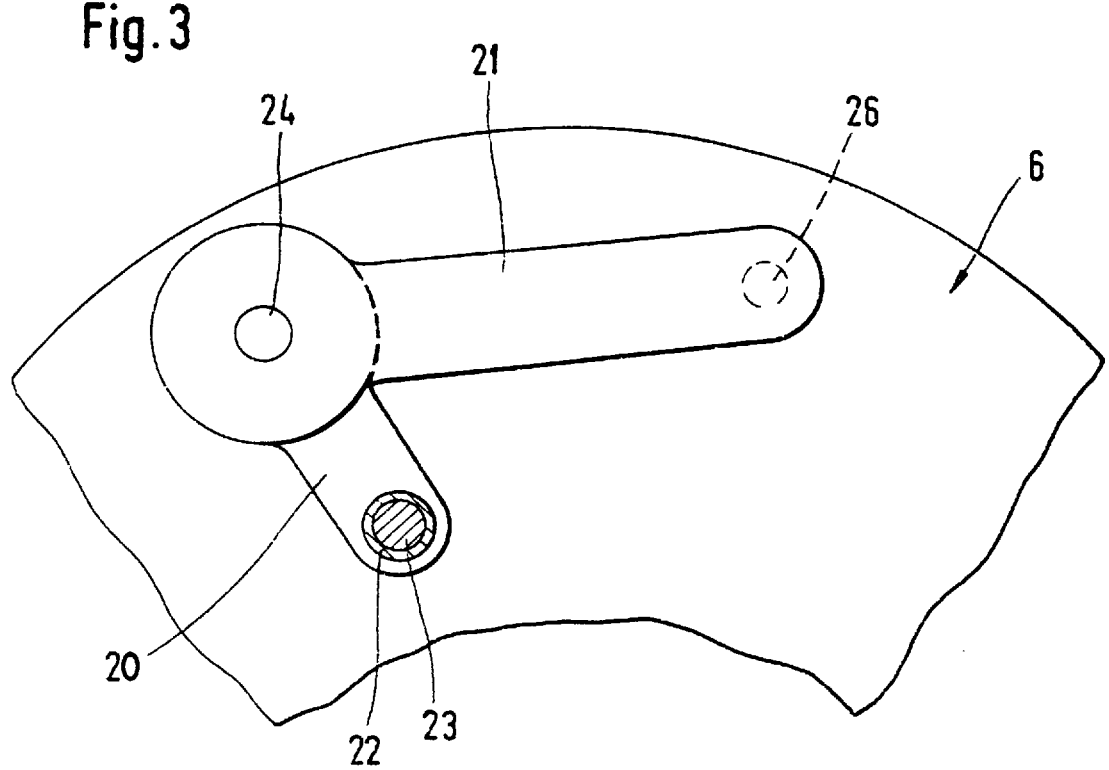
FIG. 3 is a section of the transmission from FIG. 2 along the Section line III—III.

The function of the transmission 15 of the torsional vibration damper shown in FIG. 2, can be better seen in FIG. 3. Starting from a base speed, which lies below the idle speed, the two links 20, 21 are deflected by the effect of centrifugal force from the position shown in FIG. 3, being moved in the radially outward direction. After a certain rotational angle of the two links 20, 21, they reach a final position, which is associated with a certain base speed. Although a further increase in speed increases the centrifugal force, it does not lead to any further swinging movement of the links 20, 21. However, there is an increase in the resistance offered by the links to torsional vibration, which attempts to pull the links in the radially inward direction toward the rotational axis. To this extent, the links display behavior with variable rigidity at speeds at which no further radial outward deflection is possible. Thus the absorption mass behaves so as to be effective at least within a certain speed range. This is possible, for the stated reasons, because the links 20, 21 of the transmission 15 act as the balancing weight.

Figure 4:
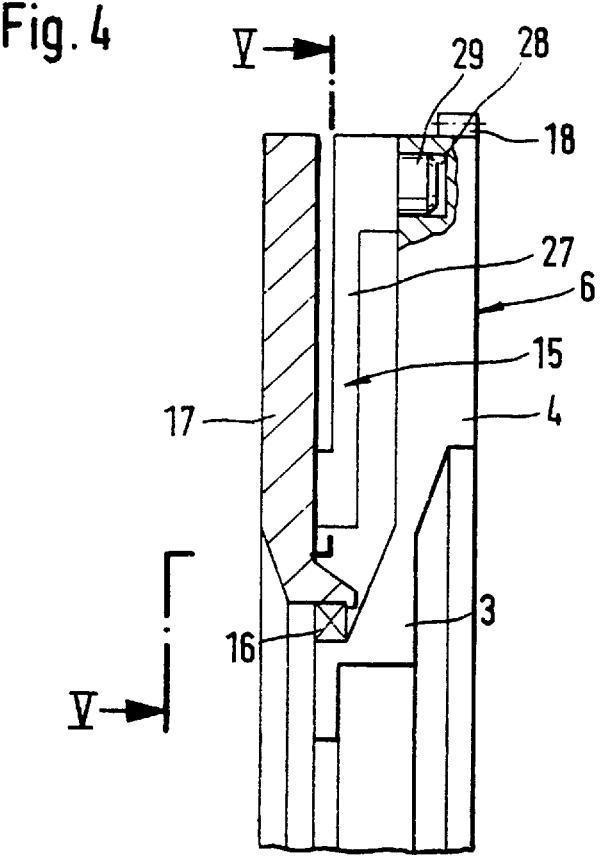
FIG. 4 is a view as in FIG. 2, but with a transmission having only one link.

The torsional vibration damper in FIG. 4 corresponds substantially to that in FIG. 2. However, one link, namely, the link 21, is dispensed with. Instead, the inertia mass 6 has a guide path 28, into which a projection 29 near one end of the link 27 engages. The other end of the link 27 is connected to the absorption mass 17. This link 27 thus acts both as the transmission 15 and as the balancing weight.

Figure 5:
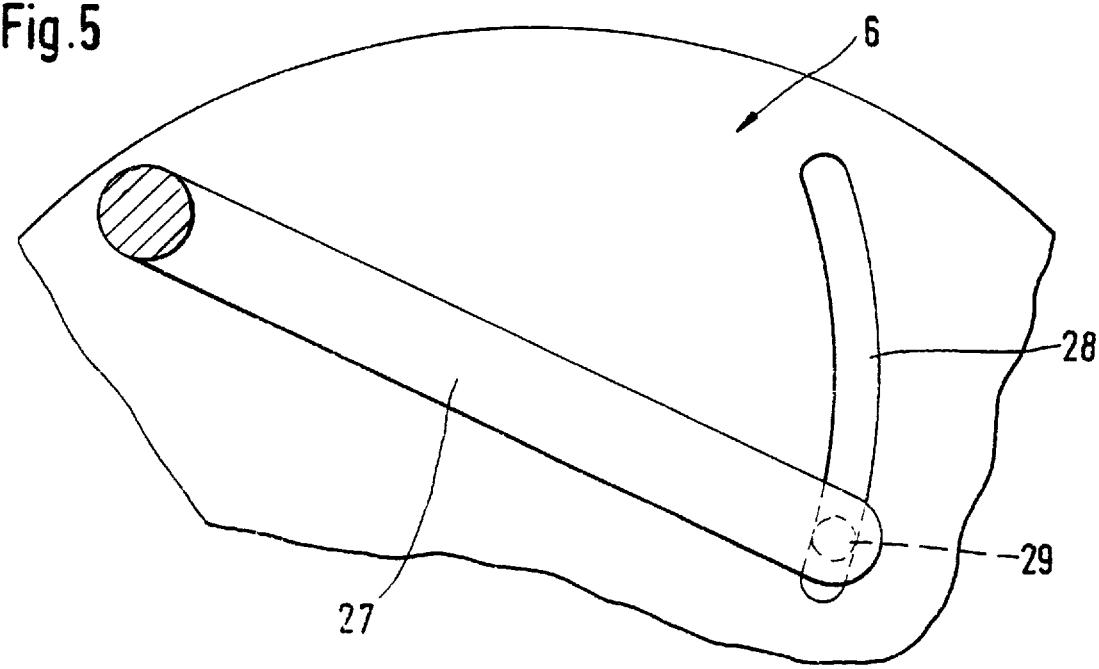
FIG. 5 is a section of the transmission in FIG. 4 along Line V—V.

The function of this embodiment is as follows: Starting from the base speed, the link 27 is deflected radially outward from the position shown in FIG. 5 by the effect of centrifugal force, until it comes to rest at the opposite end of the guide path 28. After this, due to the continuing increase in centrifugal force, variable rigidity is simulated, which is effective with respect the passed-along torsional vibrations that attempt to pull the link 27 back in the radially inward direction.

The invention is not limited by the embodiments described above which are presented as examples only but can be modified in various ways within the scope of protection defined by the appended patent claims.

We claim:

1. A torsional vibration damper, comprising:
   at least one inertia mass;
   an absorption mass;
   connecting elements arranged rotatably to connect the absorption mass to the inertia mass;
   a balancing weight associated with the absorption mass; and
   a movement-transmitting transmission configured to connect the balancing weight to the absorption mass and to the inertia mass.

2. A torsional vibration damper as defined in claim 1, wherein the transmission includes a transmission element connected to the absorption mass, the connecting elements being configured as springs, each of the connecting elements having a first end arranged to rest on the inertia mass and second end arranged to rest on the element connected to the absorption mass.

3. A torsional vibration damper as defined in claim 1, and further comprising a drive operatively connected to the inertia mass in a rotation-proof manner.

4. A torsional vibration damper as defined in claim 3, wherein the absorption mass is arranged on a side of the inertia mass that faces the drive, the transmission and the balancing weight both being arranged axially between the absorption mass and the inertia mass.

5. A torsional vibration damper as defined in claim 1, wherein the transmission includes a plurality of links, a first one of the links being connected to the inertia mass and a second one of the links being connected to the absorption whereby the links form. the balancing weight.

6. A torsional vibration damper defined as in claim 1, wherein the inertia mass has a guide path formed therein, the transmission including a link connected to the absorption mass and engaging into the guide path so as to form the balancing weight.

7. A torsional vibration damper, comprising:
   at least one inertia mass;
   an absorption mass;

connecting elements arranged to rotatably connect the absorption mass to the inertia mass;

a balancing weight associated with the absorption mass; and a movement-transmitting transmission configured to connect the balancing weight to the absorption mass and to the inertia mass, the transmission including a sun gear connected to the absorption mass, the connecting elements being configured as springs, each of the connecting elements having a first end arranged to rest on the inertia mass and a second end arranged to rest on the sun gear of the transmission.

8. A torsional vibration damper, comprising:

at least one inertia mass;

an absorption mass;

connecting elements arranged to rotatably connect the absorption mass to the inertia mass;

a balancing weight associated with the absorption mass; and a movement-transmitting planetary transmission configured to connect the balancing weight to the absorption mass and to the inertia mass, the transmission including a sun gear connected to the absorption mass, and at least one planetary gear mounted on the inertia mass, the balancing weight being configured as a hollow gear carried by the planetary gear.

* * * * *